(12) United States Patent
Harrison et al.

(10) Patent No.: US 7,248,573 B2
(45) Date of Patent: Jul. 24, 2007

(54) INTERFACE SYSTEM FOR WIRELESS NODE AND NETWORK NODE

(75) Inventors: Lee C Harrison, Chelmsford (GB); Edward Turner, Maidenhead (GB); Bryan J Donoghue, St Albans (GB); Tin Lam, London (GB); Benjamin J O Kerr, Northampton (GB)

(73) Assignee: 3Com Corporation, Marlborough, MA (US)

( * ) Notice: Subject to any disclaimer, the term of this patent is extended or adjusted under 35 U.S.C. 154(b) by 943 days.

(21) Appl. No.: 09/909,759

(22) Filed: Jul. 23, 2001

(65) Prior Publication Data

US 2002/0101842 A1 Aug. 1, 2002

(30) Foreign Application Priority Data

Feb. 1, 2001 (GB) .................. 0102508.9

(51) Int. Cl.
*H04Q 7/24* (2006.01)

(52) U.S. Cl. .................. 370/338; 370/349; 370/401; 370/352

(58) Field of Classification Search ............ 370/338, 370/349, 401, 466, 352–356
See application file for complete search history.

(56) References Cited

U.S. PATENT DOCUMENTS

| | | | | |
|---|---|---|---|---|
| 5,940,394 A * | 8/1999 | Killian | .............. | 370/393 |
| 6,111,880 A * | 8/2000 | Rusu et al. | ............ | 370/395.53 |
| 6,122,527 A * | 9/2000 | Robinson et al. | ........... | 455/557 |
| 6,337,861 B1 * | 1/2002 | Rosen | ............ | 370/389 |
| 6,400,722 B1 * | 6/2002 | Chuah et al. | ............ | 370/401 |
| 6,452,910 B1 * | 9/2002 | Vij et al. | ............ | 370/310 |
| 6,519,290 B1 * | 2/2003 | Green | ............ | 375/259 |
| 6,553,028 B1 * | 4/2003 | Tang et al. | ............ | 370/389 |
| 6,578,084 B1 * | 6/2003 | Moberg et al. | ............ | 709/236 |
| 6,600,734 B1 * | 7/2003 | Gernert et al. | ............ | 370/352 |
| 6,633,761 B1 * | 10/2003 | Singhal et al. | ............ | 455/436 |
| 6,665,549 B1 * | 12/2003 | Reed | ............ | 455/573 |
| 6,704,293 B1 * | 3/2004 | Larsson et al. | ............ | 370/255 |
| 6,714,797 B1 * | 3/2004 | Rautila | ............ | 455/552.1 |
| 6,721,306 B1 * | 4/2004 | Farris et al. | ............ | 370/352 |
| 6,741,575 B1 * | 5/2004 | Zhang et al. | ............ | 370/329 |
| 6,775,284 B1 * | 8/2004 | Calvignac et al. | ............ | 370/392 |
| 6,798,775 B1 * | 9/2004 | Bordonaro et al. | ............ | 370/392 |
| 6,826,196 B1 * | 11/2004 | Lawrence | ............ | 370/466 |
| 6,826,387 B1 * | 11/2004 | Kammer | ............ | 455/41.2 |
| 6,850,495 B1 * | 2/2005 | Baum et al. | ............ | 370/256 |
| 6,879,570 B1 * | 4/2005 | Choi | ............ | 370/329 |
| 6,885,643 B1 * | 4/2005 | Teramoto et al. | ............ | 370/252 |
| 6,996,085 B2 * | 2/2006 | Travostino et al. | ............ | 370/338 |
| 2002/0068570 A1 * | 6/2002 | Abrol et al. | ............ | 455/438 |
| 2002/0089959 A1 * | 7/2002 | Fischer et al. | ............ | 370/338 |

FOREIGN PATENT DOCUMENTS

| | | |
|---|---|---|
| EP | 0917318 A2 | 10/1998 |
| WO | WO 96/21984 | 7/1996 |
| WO | WO 00/28714 | 5/2000 |
| WO | WO 00/41375 | 7/2000 |
| WO | WO 01/05177 A1 | 1/2001 |

\* cited by examiner

*Primary Examiner*—Wing Chan
*Assistant Examiner*—Andrew C. Lee

(57) ABSTRACT

An interface between a wireless node and a network node includes an encapsulator for temporarily converting data frames into Ethernet frames for the link between the two nodes and de-encapsulating the Ethernet frames before the data is processed at the network node.

4 Claims, 6 Drawing Sheets

INTERFACE SYSTEM FOR WIRELESS NODE AND NETWORK NODE

FIELD OF THE INVENTION

This invention relates to packet-based communication networks and particularly those which include a packet processing unit and wireless receivers or transceivers by which radio communication with a communication network is achieved. The present invention particularly relates to an interface link which facilitates separation of the wireless receiving and/or transmitting part of a network node and the high level packet processing functions or 'protocol stack'.

BACKGROUND TO THE INVENTION

In recent years much attention has been given to the extension of wireless links to local area networks or other packet-based communication networks which normally consist of various forms of packet generating receiving and processing units linked by physical links constituted by, for example, twisted pair lines, coaxial cable or optical fibres. Various standards are being developed for the wireless communication of data to and from nodes which form part of a packet-based communication network. One such standard is known as 'Bluetooth'. The present invention in a preferred form is intended to be compatible with a Bluetooth standard but the subject matter of the invention is applicable to other systems.

It is known, from the systems operating in accordance with the Bluetooth standard, to provide a 'node' which is capable of receiving and/or transmitting a radio frequency signal, preferably in the form of a spread spectrum signal with 'frequency-hopped' coding. Such a node includes high level packet processing functions so that the node is immediately compatible, for example, with an Ethernet network. In such a node, the signals recovered from the baseband processing in the radio receiver are conventionally in a high speed serial data format. The transport layer for this high speed serial data is specified in the Bluetooth specification as using either USB, RS232 or UART. For a variety of reasons it is not feasible to include substantial error detecting or correcting facilities in such a format and accordingly it is not desirable to have any substantial physical separation between the radio section of the node and the high level packet processing section.

SUMMARY OF THE INVENTION

The main object of the present invention is to improve the interface between the radio receiving and/or transmitting section of a wireless node and the packet processing section and more particularly to enable a separation of the a wireless node into a 'dumb' node, which performs a conversion from the radio frequency signals to a signal format that is robust and can be used to convey data over substantial distances, and an 'intelligent' node, which is compatible with the aforementioned signal format and performs the packet processing or switch functions necessary for connection of data packets to a local area network or other network in which the node is connected. There is the further possibility that a multiplicity of 'dumb' nodes may share a single 'intelligent' node.

The present invention is based on a temporary conversion of passing between the radio receiver and/or transmitter and the intelligent node to an Ethernet format for the purpose of conveyance over a link between a dumb node and an intelligent node.

Further features of the invention will become apparent from the following description with reference to the accompanying drawings.

DETAILED DESCRIPTION OF EXEMPLARY EMBODIMENT

Figure 1:
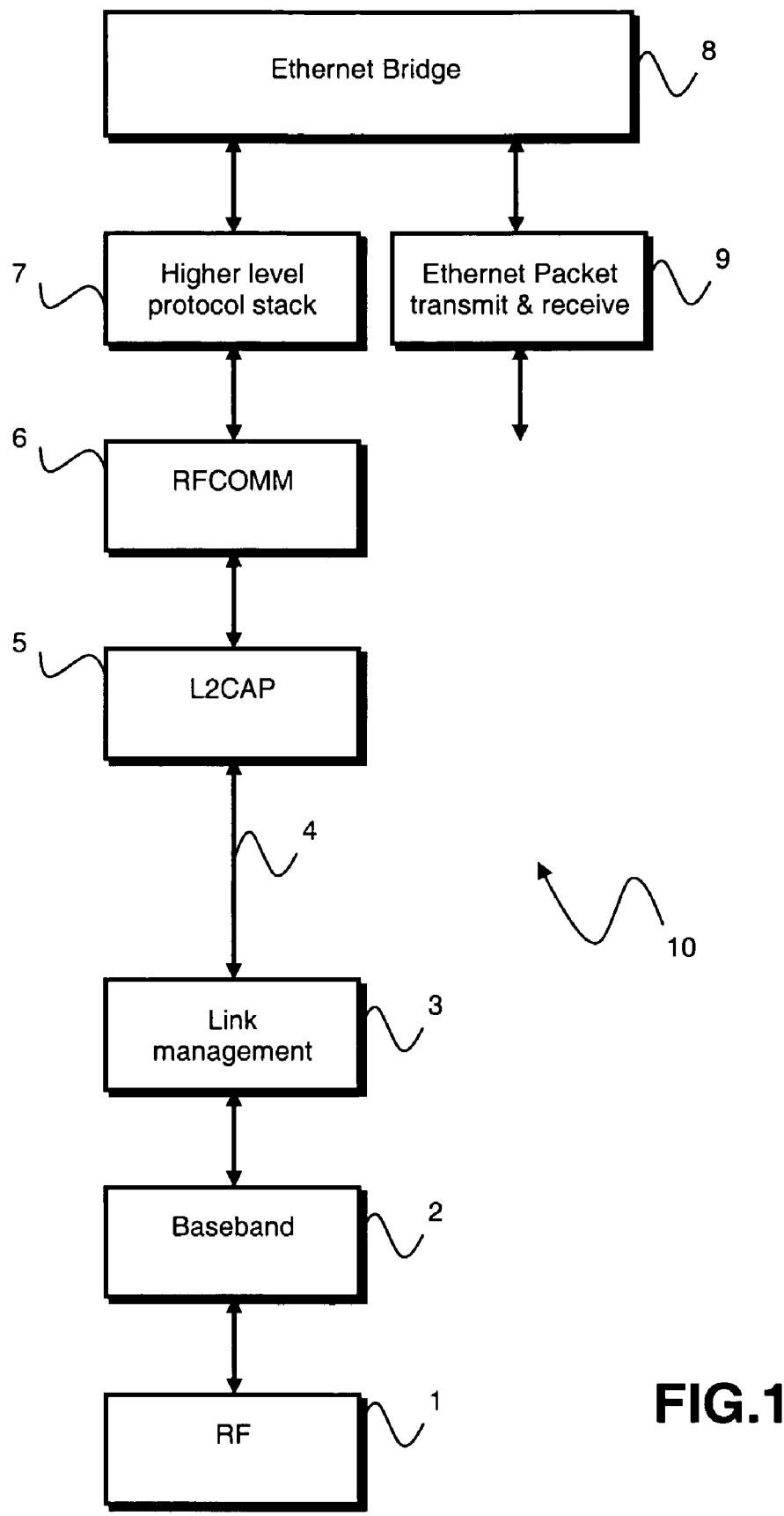
FIG. 1 is a schematic illustration of a known form of wireless node for use according to the 'Bluetooth' network standard.

FIG. 1 of the drawings illustrates a known form of wireless node conforming to the 'Bluetooth' transmission protocol. It comprises a node 10 which has a RF section 1, a baseband section 2, a link management section LMP(Link Management Protocol) 3, a serial link 4, an L2CAP decoder section 5, a point-to-point encapsulation section 6, denoted RFCOMM, a protocol stack 7, an Ethernet bridge 8 and a section 9 which attaches the bridge to a LAN or other network. The word 'section' is interchangeable with 'layer'.

The RF section 1 of the known node is commonly a spread spectrum receiver and transmitter which, as far the receiver is concerned, accepts a spread spectrum signal having a bandwidth of the order of 80 MHz (in the range 2400 MHz to 2480 MHz), converts the radio frequency signal to an intermediate frequency and after appropriate filtration and amplification converts the intermediate frequency signal to an appropriate lower frequency where the signal is split into I and Q components, preferably converted into digital form and subject to correlation employing a direct sequence code generator employing the same code as was used to spread the spectrum of the original signal. The system will include appropriate synchronizers and baseband processing which provides serial data signals generally in a form of a preamble, an access code section and a payload (i.e. the message data). These packets will normally take the form of a 3 part packet with a 72 bit access code, a 54 bit header followed by a payload of between 0 and 2745 bits. The access code is used for synchronisation, DC offset compensation and identification, and has the format of a 4-bit preamble, an 64-bit sync word and a 4-bit trailer if a header follows. Section B of the Bluetooth specification V1.1 gives a complete list of access code formats and packet header types.

L2CAP is a protocol which is employed in the baseband for the purposes of protocol multiplexing, segmentation and reassembly. The various packet codes conforming to the protocol are embedded within the packet payload.

The link management section 3 of the known receiver is arranged to control the LMP Link Manager Protocol. This is used for link setup security and control. LMP messages have priority over the L2CAP data and are filtered out at the receiving side and are not propagated to the higher levels. Serial data is passed over the interface (known as the HCI or host controller interface). The section 5 decodes the L2CAP data and encapsulates it as packets conforming to a point-to-point protocol. These packets are conveyed to section 6. The RFCOMM protocol provides emulation of serial ports over the L2CAP protocol. This is based on ETSI standard TS 07.10. The purpose of RFCOMM is to provide a complete communications path between applications. RFCOMM is intended to cover applications that make use of the serial ports of the devices in which they reside. In a simple configuration the communication segment is a Bluetooth link from one device to another (direct connect). Where the communications segment is another network RFCOMM connects using a null modem type connection. In section 7 each of the RFCOMM stacks is terminated. An application running on top of this stack converts the PPP type data into valid Ethernet packets with correct source and destination addresses, so that they can be processed by the Ethernet bridge which is illustrated with transmit and receive links 9.

The known system and other systems rely on a high speed serial link This is specified in the Bluetooth specification as either USB, RS232 or UART between a radio receiver and a packet processor.

The existence of this serial link is a physical constraint on the separation of the dumb or transducing part of the node and the 'intelligent' or packet processing part of the node. It is the object of the present invention to increase this physical separation by means of converting the serial data to Ethernet packets and reconverting them at the end of the link between the dumb and intelligent nodes.

The link setup for a voice in a Bluetooth system is done via TCS Binary (Telephony Control Protocol Specification). These signals appear as normal Bluetooth data and are sent through the Bluetooth stack as normal L2CAP data. This TCS Binary link is used to establish a separate PCM connection to the Bluetooth baseband section.

For the purpose of the Ethernet encapsulation, these PCM signals need to be tagged and multiplexed along with the HCI signals into Ethernet packets. The multiplexing can be carried out using a simple time division scheme. However to maintain a suitable quality of service for the voice connection, it is preferable that the voice data be given priority. At the receiving end the de-encapsulation logic needs to be able to recognise the tagged PCM data and be able to separate it from the other Bluetooth traffic and send it to either a handset at one end or some type of digital exchange at the other. At either end of the link there will normally be some form of echo cancellation carried out using a simple digital signal processor.

Figure 2:
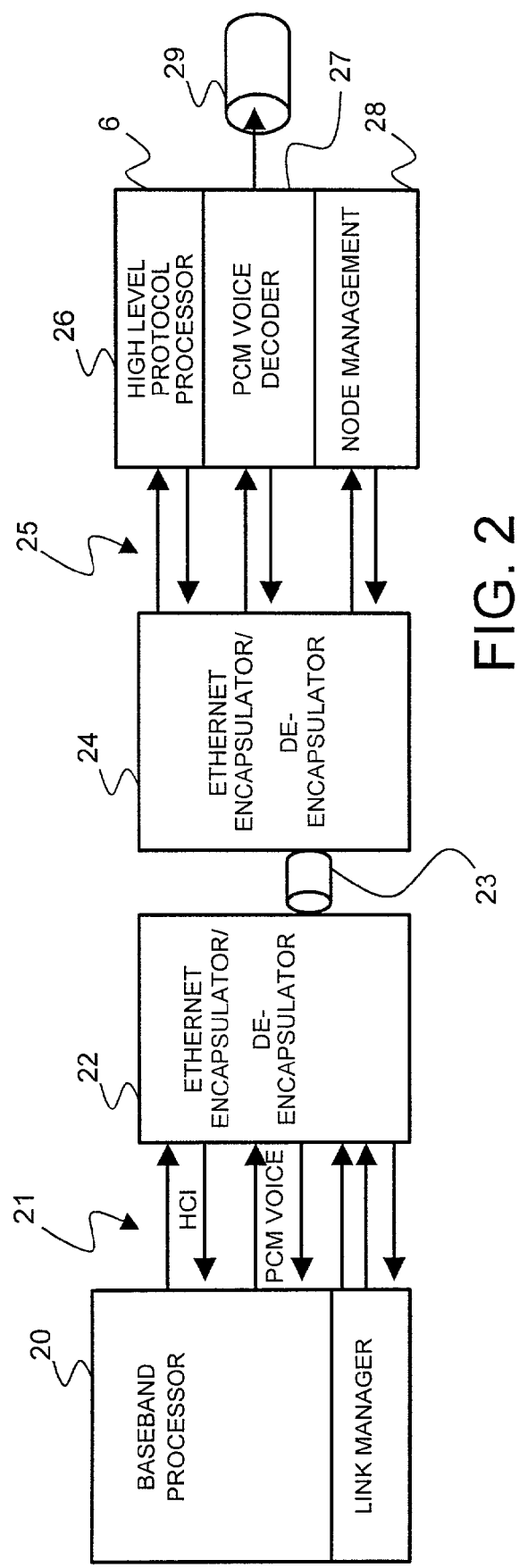
FIG. 2 is a schematic diagram of a system comprising a 'dumb' and a 'intelligent' node according to the invention.
Figure 3:
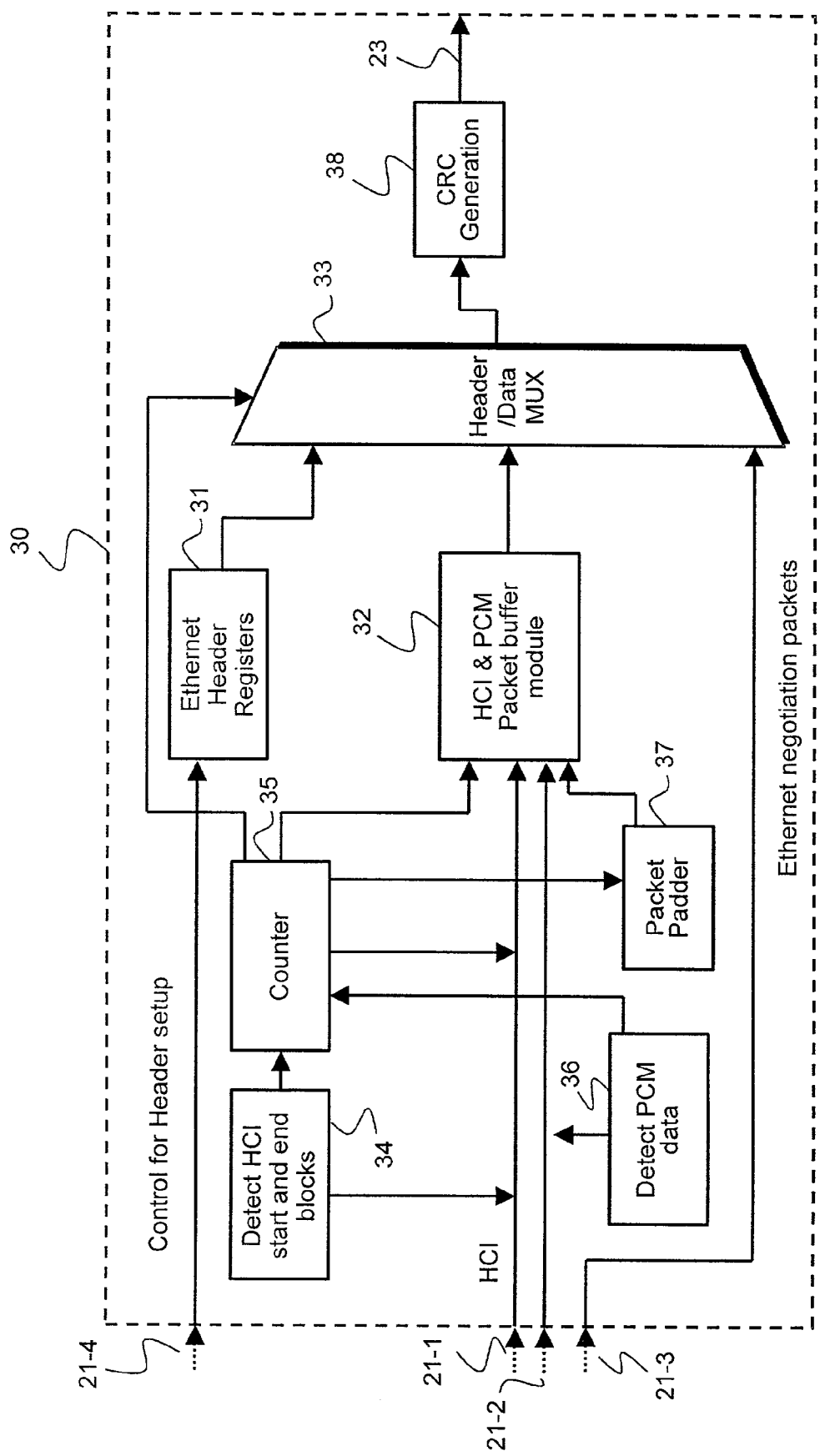
FIG. 3 illustrates an encapsulation unit intended for use in the system of FIG. 2.

FIG. 2 illustrates schematically the main features of a system according to the invention. FIG. 2 includes a baseband processor 20 of the kind shown in FIG. 1. The baseband processor and a link manager are connected to an Ethernet encapsulator/de-encapsulator 22 by means of lines 21 which convey HCI signals and PCM voice signals between the processor and encapsulator/de-encapsulator and also include a further line which will become apparent later. The encapsulator/de-encapsulator includes an encapsulator 30 as shown in FIG. 3 and a de-encapsulator 40 shown in FIG. 4 connected at one side to the baseband processor and at the other side to a suitable physical link 23 (shown as a length of coaxial cable) for the conveyance of Ethernet signals to an Ethernet encapsulator/de-encapsulator 24. This is similar to the encapsulator/de-encapsulator 22. It includes an encapsulator 30 of the kind shown in FIG. 3 for converting signals to Ethernet form over the link 23 to the de-encapsulator in section 22 and a de-encapsulator 40 of the kind shown in FIG. 4 for de-encapsulating Ethernet packets received over the link 23. The encapsulator/de-encapsulator 24 is connected by lines 25 to an intelligent node 26 which includes a high level protocol processor 6, corresponding to the stack 6 in FIG. 1, a PCM voice decoder 27 and a node management section 28. Ethernet packets which are developed by the high level protocol processor are coupled out on a physical link 29, again shown as a length of coaxial cable.

In this particular system, there is provision not only for the conveyance of HCI data in high speed serial form and its encapsulation as Ethernet packets for the physical link between the dumb node and the intelligent node but also provision for sending PCM voice data.

FIG. 3 illustrates an encapsulation unit of which one each would be provided in each of the encapsulator/de-encapsulators 22 and 24. The encapsulator shown in FIG. 3 is annotated on the assumption that it is part of the encapsulator/de-encapsulator 22; the encapsulator in block 24 is similar but reversely oriented.

Figure 6:
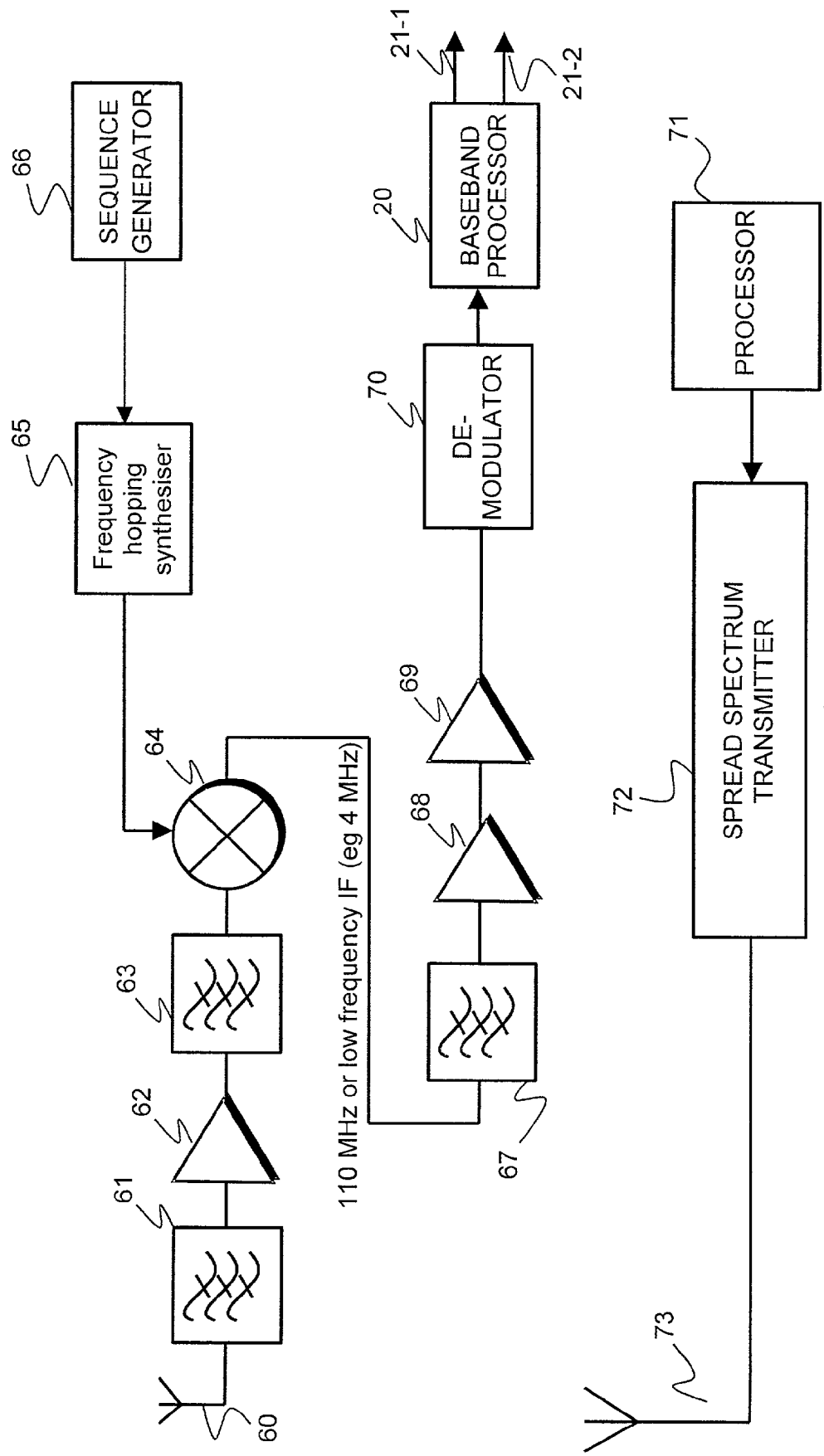
FIG. 6 illustrates a radio receiver which would normally form part of a system including the system of FIG. 2.

The encapsulator shown in FIG. 3 receives on line 21-1 a high-speed serial data signal of the general kind shown at 50 in FIG. 6 to be described. It also receives on line 21-2 pulse code modulated voice data. These lines 21-1 and 21-2 are connected to a buffer module 32. Within the buffer modules 32 is a dual FIFO, one for the Bluetooth (HCI) data and one for the voice (PCM) data. The module 32 interleaves data from the FIFO's before outputting a single data stream to the multiplexer 33. Preferably the buffer module 32 tags each of the HCI or PCM packets with a configurable byte (or longer tag if desired) added to the front of the packet. The tag identifies the packet type (HCI or PCM) and the packet size. The tag is used by the de-encapsulator (FIG. 4) to split up the Ethernet packet employed to convey the HCI and PCM packets over the link 23. The start and end blocks of the HCI data are detected in a detector 34. When the start of an HCI block is detected, a bit counter 35 commences running, sensing the bits on the line 21-1. The counter is stopped when the end block of the HCI data is detected. The counter data is compared with preset 'watermarks' (i.e. threshold values) for each of the FIFOs in buffer module 32. PCM data is sensed by detector 36 which is coupled to the counter 35. The counter data is also used when the FIFOs within the buffer module 32 do not contain enough data to form a whole Ethernet packet. If this is the case the counter will wait for a predetermined length of time, waiting for more HCI or PCM data, before triggering the packet padder which will provide padding data to supplement the existing HCI or PCM data to form at least a minimum length Ethernet packet.

This arrangement allows more than one HCI or PCM packet to be encapsulated in an Ethernet packet and ensures that the Ethernet packet is at least its prescribed minimum length.

When the counter signals the end of an HCI packet the packet buffer is signalled to provide an output to a demultiplexer 33

Multiplexer 33 also has an input of line 21-3 which is coupled to the manager. Also coupled to the multiplexer are Ethernet header registers 31.

When the system is switched on, a control signal will initialize the header registers 31. The purpose of these is to supply headers for Ethernet packets made up of those headers and packet data taken from the buffer 32. Such Ethernet packets are passed through a CRC generator 38 which computes the CRC code in ordinary manner and adds the CRC data at the end of the Ethernet packet in normal manner.

As a preliminary to the encapsulation of HCI data to Ethernet packets, the link manager on start up of the node will generate what are known as 'negotiation' packets which are dedicated multicast packets that are coupled by way of the multiplexer 33 to the link 23. The purpose of these packets is to elicit a response which identifies the MAC address of the processor 26 so that the Ethernet packets may be properly headed with a MAC destination address.

Figure 4:
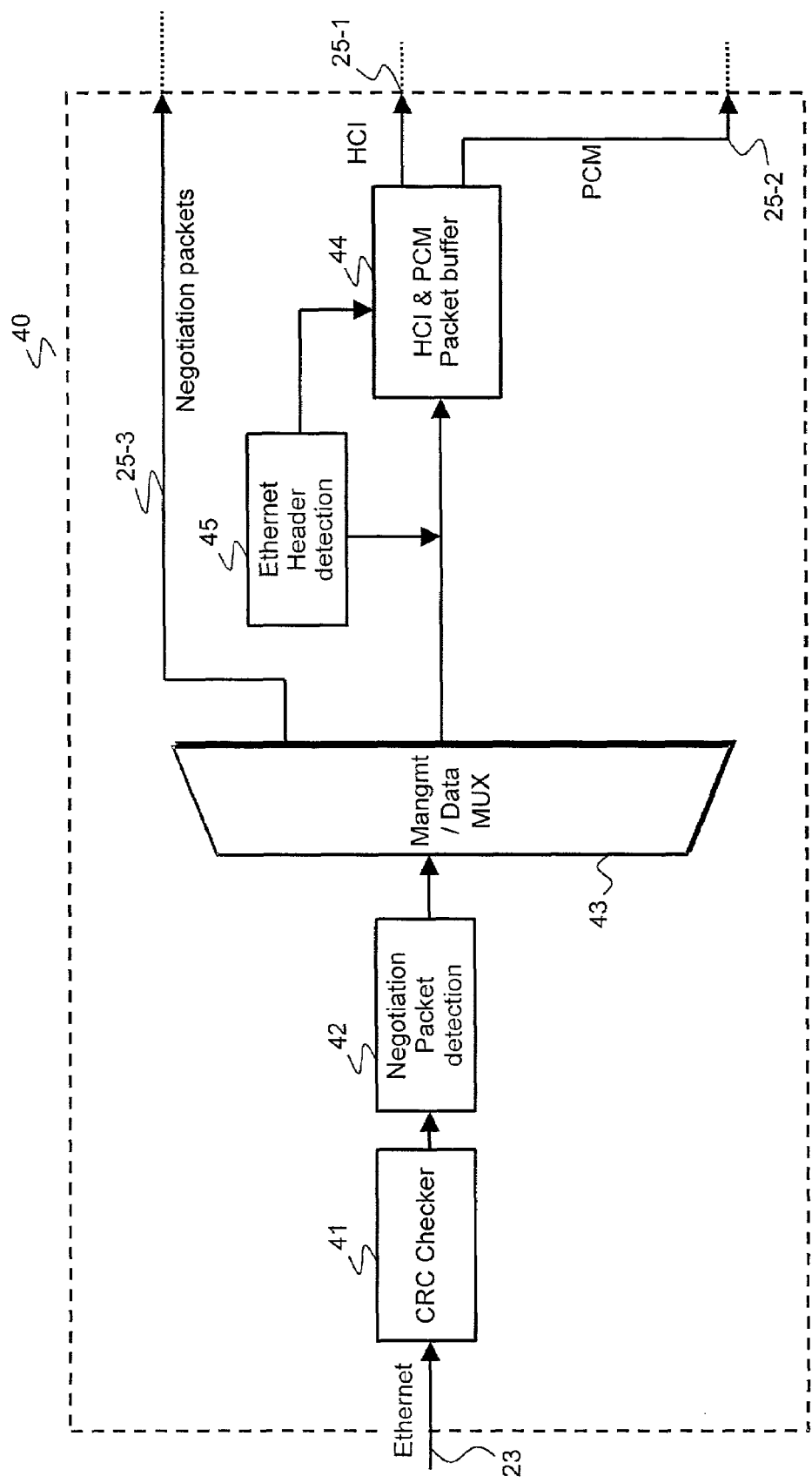
FIG. 4 illustrates an encapsulation unit intended for use in the system shown in FIG. 2.

FIG. 4 shows the de-encapsulator. Ethernet packets on the line 23 are coupled through a CRC checker 41. If the incoming packet is a negotiation packet it is detected by detector 42 which provides a control to a multiplexer 43 to drive the negotiation packet out on line 25-3. In FIG. 4 these packets will go out on line 25-3 to the high level protocol processor. In the reverse direction, the negotiation packets will be directed to the link manager in order to provide a MAC address for coupling to the Ethernet header registers 31.

If however the packets received over line 23 are not negotiation packets, the Ethernet header is detected by detector 45 in order to provide a control for the removal of the Ethernet header as the packets are read into buffer 44 splitting the Ethernet packet into an HCI packet and/or pulse code modulation signals to be fed out on lines 25-1 and 25-2 respectively. Once the Ethernet header has been removed, the tags appended to the front of each of the HCI or PCM packets determine whether the packets are sent out on line 25-1 (for HCI packets) or 25-2 (For PCM packets).

Figure 5:
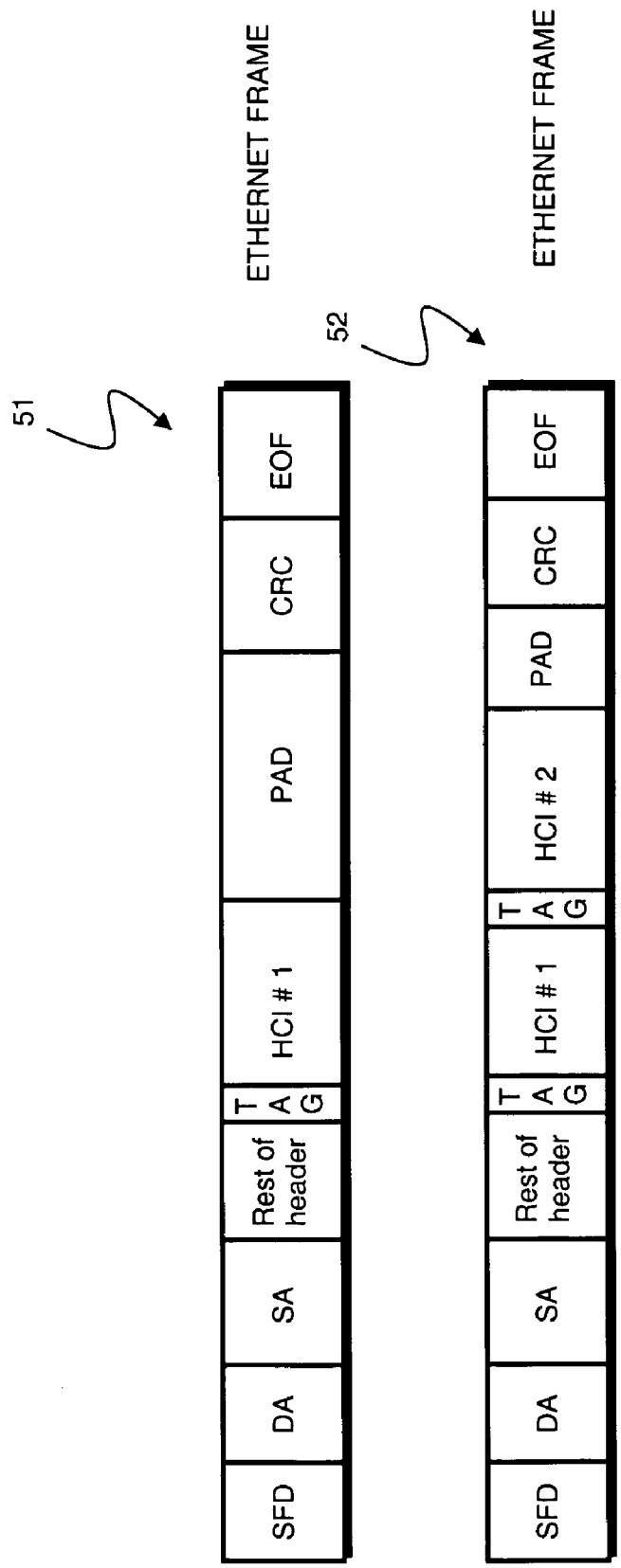
FIG. 5 schematically illustrates various forms of frame that occur in the system of FIG. 2.

FIG. 5 illustrates the relationship between the HCI data frames and the Ethernet frames.

There are several different types of HCI packets, for example Command Packets, ACL data packets, SCO data packets and negotiation packets. These are all specified in detail in the Bluetooth specification. For the purpose of this invention the HCI packets are transmitted to the encapsulation logic in their RS232 transport format which consists of an 8 bit packet identifier, and 8 bit sequence and finally the packet payload, the length of which can be determined by the packet identifier. The Ethernet frame 51, shown in somewhat simplified form, consists of a start of frame delimiter (SFD) a destination address (typically a 48-bit MAC address), a source address (typically a 48-bit MAC address), the rest of the header, which is in a generally prescribed form not relevant to the present invention, the tag added by module 32, a section which corresponds to the HCI packet, denoted HCI #1, padding, a CRC section and an end of frame section. The description of FIG. 3 assumes that the HCI frames are shorter than the minimum length of an Ethernet frame and do not exceed the maximum length. It also assumes that a single HCI frame will be converted, with padding if necessary, to a frame conforming to the Ethernet protocol. However, as indicated in the foregoing a multiplicity of HCI frames could be included in a single Ethernet frame, as shown in frame 51. The padding may be meaningless data but could be in the format of an HCI packet which has the destination of a null stack and can therefore be discarded.

FIG. 5 shows only HCI frames in the Ethernet frames but as indicated above PCM frames can be included in the Ethernet frames.

FIG. 6 illustrates for completeness a spread spectrum transmitter and receiver of the kind intended for use in a Bluetooth node. This will only be described in formal terms, since the form of the receiver is prescribed according to the Standard.

The receiving part of the node comprises an antenna 60, a bandpass filter 61 (restricting the input signal to the range 2.400 GHz to 2.480 GHz), amplified by RF amplifier 62, again bandpass filtered in filter 63 and coupled to a first mixer 64, which receives a signal from a frequency-hopping synthesizer 65 controlled by a frequency-hopping sequence generator 66. The output from the first mixer (either 10 MHz or a low-frequency intermediate frequency such as a 4 MHz) is bandpass filtered by a channel filter 67, amplified by intermediate frequency amplifiers 68 and 69 and demodulated in a demodulator 70, the baseband output being processed in baseband processor 20 (see FIG. 1)

The transmitter section is in ordinary form and consists of a baseband processor 71, converting HCI data and PCM voice data to an appropriate modulated form, and a spread spectrum transmitter 72 coupled to an antenna 73. The spread spectrum transmitter will include a mixer receiving the baseband signal and the output of a sequence generator, and up converters for converting the spread spectrum signal to the appropriate radio frequency band.

What is claimed is:

1. A system for receiving data signals and coupling data signals to an Ethernet network, said system comprising:
a plurality of dumb nodes, each dumb node comprising a radio receiver and an encapsulator, said radio receiver including a baseband processor for providing serial data signals composed of data frames each including a packet payload, and said encapsulator including means for encapsulating said data frames within temporary Ethernet frames, and wherein each dumb node includes a multiplexer for multiplexing host controller interface data with pulse-code modulated voice data into said data frames;
an intelligent node comprising a de-encapsulator, and a protocol processor for providing addressed Ethernet packets for transmission in said network; and
a plurality of physical links, each physical link coupling one of said dumb nodes with said intelligent node;
wherein:
said encapsulator is coupled to said physical link to send said temporary Ethernet frames across the physical link only to said de-encapsulator;
said de-encapsulator includes means for receiving temporary Ethernet frames from said link and de-encapsulating said temporary Ethernet frames to recover said data frames; and
said protocol processor includes means for converting said data frames into said addressed Ethernet packets.

2. A system as in claim 1 wherein said encapsulator includes means for tagging said data frames before they are encapsulated within said temporary Ethernet frames.

3. A system as in claim 1 wherein said encapsulator includes means for inserting at least one of said data frames followed by padding data into a message section of one of said temporary Ethernet frames.

4. A method of receiving signals and transmitting signals over a local area network, comprising:
receiving, at one of a plurality of dumb nodes, a spread-spectrum signal containing message data and converting said spread-spectrum signal into serial data frames conforming to a host controller interface format;
encapsulating said serial data frames into Ethernet frames;
conveying said Ethernet frames over one of a plurality of physical links only, each of said plurality of physical links coupling one of said plurality of dumb nodes to an intelligent node;
receiving, at said intelligent node, said Ethernet frames from said physical link;

de-encapsulating, at said intelligent node, said Ethernet data frames to provide recovered serial data frames;

developing, by means of a protocol processor at said intelligent node, addressed Ethernet data packets from said recovered serial data frames; and forwarding, from said intelligent node, said addressed Ethernet data packets to said local area network.

* * * * *